United States Patent
Onuoha

(10) Patent No.: US 9,869,160 B2
(45) Date of Patent: Jan. 16, 2018

(54) DISSOLVABLE SIEVE, PARTICULATE TOLERANT SYSTEM AND METHOD OF PROTECTING A TOOL FROM PARTICULATE

(71) Applicant: Jombo Onuoha, Houston, TX (US)

(72) Inventor: Jombo Onuoha, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 521 days.

(21) Appl. No.: 14/293,560

(22) Filed: Jun. 2, 2014

(65) Prior Publication Data
US 2015/0345255 A1    Dec. 3, 2015

(51) Int. Cl.
*E21B 34/00* (2006.01)
*E21B 34/06* (2006.01)
*E21B 43/08* (2006.01)
*E21B 43/12* (2006.01)

(52) U.S. Cl.
CPC ............ *E21B 34/063* (2013.01); *E21B 43/08* (2013.01); *E21B 43/12* (2013.01)

(58) Field of Classification Search
USPC ............ 166/244.1, 105, 227, 179, 243, 316
See application file for complete search history.

(56) References Cited

U.S. PATENT DOCUMENTS

| 5,327,960 A * | 7/1994 | Cornette ................. E21B 34/12 166/158 |
| 2004/0060698 A1 | 4/2004 | Ravensbergen et al. |
| 2008/0296024 A1 | 12/2008 | Huang et al. |
| 2009/0084553 A1 | 4/2009 | Rytlewski et al. |
| 2009/0218097 A1 * | 9/2009 | Cook ..................... E21B 37/00 166/250.17 |
| 2011/0135953 A1 * | 6/2011 | Xu ............................. B22F 1/02 428/548 |
| 2011/0155392 A1 * | 6/2011 | Frazier .................... E21B 34/06 166/373 |
| 2012/0125630 A1 * | 5/2012 | Sevre ...................... E21B 29/00 166/376 |
| 2012/0175132 A1 * | 7/2012 | Watson ................... E21B 33/04 166/386 |
| 2013/0048305 A1 * | 2/2013 | Xu ........................... E21B 23/01 166/376 |
| 2013/0092394 A1 * | 4/2013 | Holderman ........... E21B 43/108 166/373 |
| 2014/0020898 A1 | 1/2014 | Holderman et al. |
| 2014/0096970 A1 | 4/2014 | Andrew et al. |

OTHER PUBLICATIONS

Baker Hughes, "IN-Tallic Disintegrating Frac Balls"; www.bakerhughes.com; 2011; 2 pages.
Notification of Transmittal of the International Search Report and the Written Opinion of the International Searching Authority, or the Declaration; PCT/US2015/028687; dated Aug. 3, 2015; 8 pages.

* cited by examiner

*Primary Examiner* — Taras P Bemko
(74) *Attorney, Agent, or Firm* — Cantor Colburn LLP

(57) ABSTRACT

A dissolvable sieve includes a body that is permeable to fluid flow therethrough constructed of a material configured to dissolve in a target environment.

18 Claims, 2 Drawing Sheets

DISSOLVABLE SIEVE, PARTICULATE TOLERANT SYSTEM AND METHOD OF PROTECTING A TOOL FROM PARTICULATE

BACKGROUND

Tools that operate in tubular systems such as valves and actuators, for example, are subject to malfunctioning due to contamination that can restrict movements needed to allow for the proper functioning of the tool. Contamination traps such as filters can be employed to protect tools from contamination and work well for their intended purpose. Industry, however, is always receptive to new devices and methods that advance the state of the art.

BRIEF DESCRIPTION

Disclosed herein is a dissolvable sieve. The sieve includes a body that is permeable to fluid flow therethrough constructed of a material configured to dissolve in a target environment.

Further disclosed herein is a particulate tolerant system. The system includes a tubular, at least one body positioned within the tubular having openings configured to allow fluid flow therethrough while preventing flow of particulates therethrough, the at least one body is dissolvable in a target environment, and a tool positioned within the tubular protected from particulates by the at least one body.

Further disclosed herein is a method of protecting a tool from particulate. The method includes filtering fluid through openings in a body prior to reaching the tool and dissolving the body.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
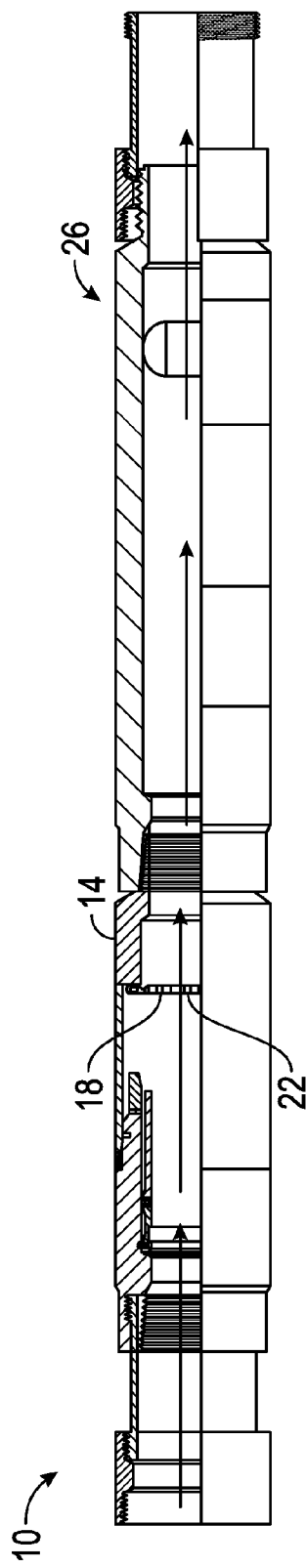
FIG. 1 depicts a quarter cross sectional view of a particulate tolerant system disclosed herein.

Referring to FIG. 1, a particulate tolerant system disclosed herein is illustrated at 10. The system 10 includes a tubular 14, at least one body 18 positioned within the tubular having openings 22 configured to allow fluid to flow therethrough while preventing flow of particulates therethrough. The at least one body 18 is dissolvable in a target environment, and a tool 26 positioned within the tubular 14 is protected from particulates by the at least one body 18. The openings 22 are sized such that small particulates that are able to pass through the openings 22 are of a size that is not detrimental to the operation of the tool 26. In one embodiment the tool 26 is a valve employable in an earth formation borehole such as is used in the hydrocarbon recovery and the carbon dioxide sequestration industries, for example, although any tool that can be detrimentally affected by particulate contamination is contemplated.

The openings 22 can be formed in various ways and have various sizes and shapes. For example, the openings 22 could be drilled through the body 18 or electric discharge machined (EDM) therethrough. Alternately the openings 22 could be formed through a lost core technique, via a foaming process, or another process. Depending upon the method of making the openings 22 the openings 22 may extend straight through the body 18, they may be at angles through the body 18 or they may form tortuous paths through the body 18.

The embodiment of the particulate tolerant system 10 illustrated in FIG. 1 employs just one of the at least one bodies 18. It should be appreciated however that more than one of the bodies 18 could be employed in alternate embodiments. For example, two of the bodies 18 could be positioned within the tubular 14, with one on each of two opposing sides of the tool 26. This configuration could protect the tool 26 from particulate contamination from either side. Also more than one of the bodies 18 could be deployed on one or both sides of the tool 26. A possible advantage of having more than one of the bodies 18 on a same side of the tool 26 is to graduate sizes of the openings 22 in each of the bodies 18 such that the openings 22 in the body 18 furthest from the tool 26 are larger than openings 22 in the body 18 closer to the tool 26. The foregoing multiple bodied structure can resist plugging under an amount of particulate that would result in plugging if just one of the bodies 18 were employed.

Another benefit of allowing fluid to flow through the openings 22 in the body 18 is the fact that pressure can be communicated or transported through the openings 22 in the body 18. This is beneficial in embodiments of the system 10 wherein the tool 26 is actuatable by pressure since the tool 26 can then be actuated while the body 18 remains in the tubular 14 preventing particulates from passing thereby.

Figure 2:
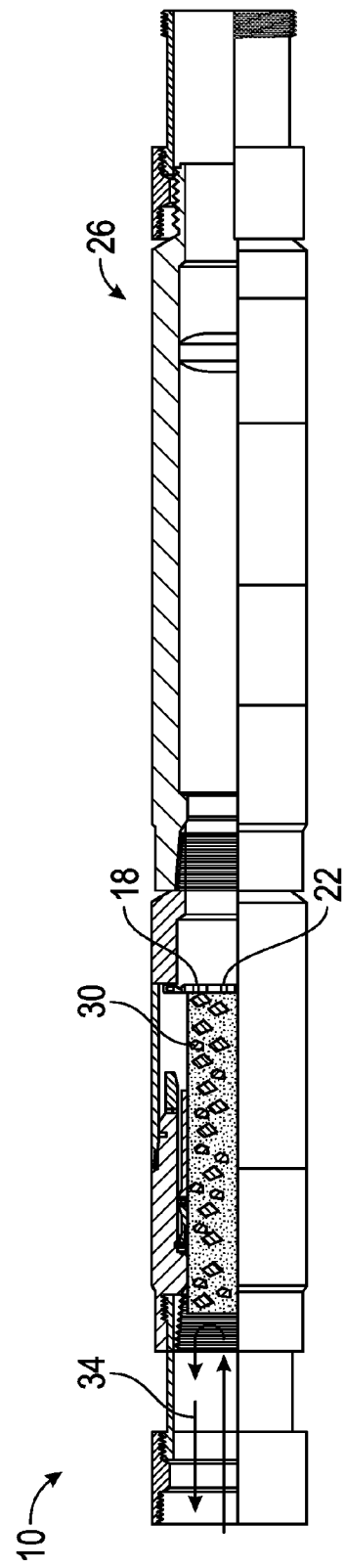
FIG. 2 depicts a quarter cross sectional view of the particulate tolerant system of FIG. 1 in an alternate condition.

Referring to FIG. 2, in instances wherein a substantial amount of particulate 30 has accumulated against the body 18 due to it being occluded from flowing through the openings 22, restriction of flow and even pressure through the openings 22 can occur. While in such a scenario the body 18 continues to protect the tool 26 from particulate 30 actuation of the tool 26 via pressure communicated through the openings 22 may be prevented. Circulating the particulate 30 away from the body 18 via fluid circulated according to arrows 34 should render the tool 26 actuatable without exposing the tool 26 to the potentially detrimental particulate 30.

After the tool 26 has been actuated it may be desirable to remove the body 18 and let fluid and particulate 30 flow to and past the tool 26 and to allow for intervention past the body 18. The dissolvable nature of the body 18 facilitates such removal. Dissolution can result from exposure to an environment that is anticipated to exist where the body 18 will be deployed, such as in a downhole environment, for example. This environment may include oil, gas, brine, high temperatures and high pressures, for example, that can either initiate or cause complete dissolution of the body 18. The body 18 can be made of a material and geometric design to control a rate of dissolution thereof In so doing an operator may be able to time the exposure of the body 18 and actuation of the tool 26 to occur after running the body 18 and the tool 26 and simply allow the dissolution thereafter to remove the body 18 without additional intervention. Alternately, the body 18 may be configured to be frangible so that it can be removed more quickly by breaking or fracturing it under high impact loads, such loads could be created by high pressure, for example.

In other embodiments the body 18 may be configured to dissolve after exposure to an artificial environment, such as an acid or a base, for example. In such an embodiment an operator may rely on the body 18 protecting the tool 26 from particulate indefinitely. Then when the operator desires removal of the body 18 he simply exposes the body 18 to the appropriate artificial environment to cause dissolution thereof In one embodiment, the body 18 is manufactured from a high strength controlled electrolytic metallic material. For example, a variety of suitable materials and their methods of manufacture are described in United States Patent Publication No. 2011/0135953 (Xu et al.), the Patent Publication of which is hereby incorporated by reference in its entirety. An example of such a material is the IN-Tallic™ material by Baker Hughes Inc.

Figure 3:
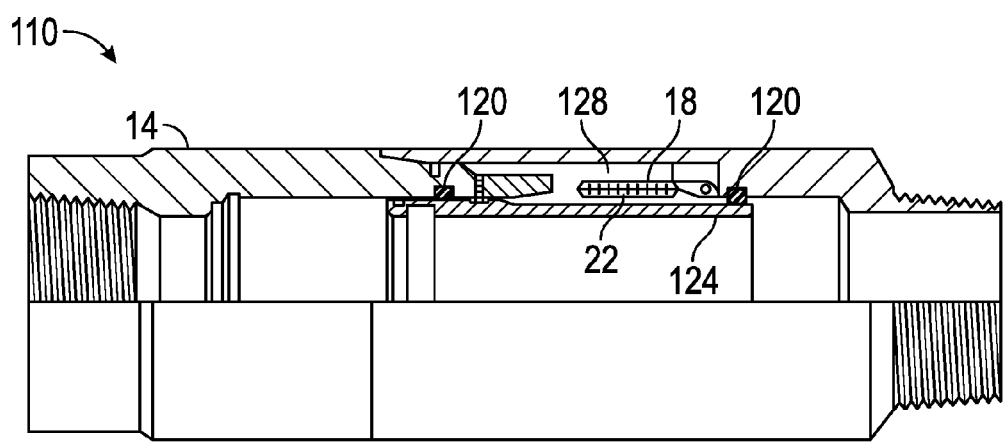
FIG. 3 depicts a quarter cross sectional view of a portion of an alternate particulate tolerant system.

Referring to FIG. 3, a portion of an alternate embodiment of a particulate tolerant system is illustrated at 110. The portion 110 employs similar features to those of the system 10 and as such like elements are designated with the same reference characters. The primary difference is that the portion 110 includes seals 120 that slidably sealingly engage a sleeve 124 with the tubular 14. The seals 120, the tubular 14 and the sleeve 124 define a cavity 128 that houses and isolates the body 18 from a target environment until movement of the sleeve 124. Since in this embodiment dissolution does not begin until the body 18 is exposed to the target environment the foregoing structure allows an operator to delay such exposure until a desired time.

The sleeve 124 also locks the body 18 in a first position until it is moved to thereby allow the body 18 to move to a second position. The body 18 in the illustrated embodiment is in the shape of a flapper and it moves between the first and second positions in a manner similar to that of a flapper valve with the first position being open and the second position being closed. One primary difference between the body 18 and a flapper being that fluid is able to flow through the openings 22 in the body 18 when the body 18 is in the second position whereas a conventional flapper prevents such fluid flow.

The body 18 is not limited to such a shape however, and in other embodiments a dissolvable sieve body disclosed herein may be a portion of a downhole tool including plugs, direct connect plugs, bridge plugs, wiper plugs, fracturing plugs, components of fracturing plugs, drill in sand control beaded screen plugs, inflow control device plugs, polymeric plugs, disappearing wiper plugs, cementing plugs, balls, diverter balls, shifting and setting balls, swabbing element protectors, buoyant recorders, pumpable collets, float shoes, and darts, screen basepipe plugs, coatings for balls and seats, liner port plugs, atmospheric discs, atmospheric chamber discs, debris barriers, drill in stim liner plugs, inflow control device plugs, seats, ball seats, direct connect disks, drill-in linear disks, gas lift valve plug, fluid loss control flappers, shear out plugs, flapper valves, gaslift valves, sleeves, screen protectors, seal bore protectors, electric submersible pump space out subs, slips, dogs, collet restraints, liner setting sleeves, timing actuation devices, whipstock lugs, emergency release tools, mandrels, release mechanisms, components of perforating gun systems, disintegrable whipstock for casing exit tools.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A dissolvable sieve, comprising:
   a body defining a flapper, the body being permeable to fluid flow therethrough constructed of a material configured to dissolve in a target environment.

2. The dissolvable sieve of claim 1, wherein the body is configured to take at least a period of time to dissolve after initial exposure of the body to the target environment.

3. The dissolvable sieve of claim 1, wherein the target environment is anticipated to exist downhole.

4. The dissolvable sieve of claim 1, wherein the target environment includes an acid or a base.

5. The dissolvable sieve of claim 1, wherein the body includes a plurality of openings extending therethrough.

6. The dissolvable sieve of claim 1, wherein the body is selected from the group consisting of plugs, direct connect plugs, bridge plugs, wiper plugs, fracturing plugs, components of fracturing plugs, drill in sand control beaded screen plugs, inflow control device plugs, polymeric plugs, disappearing wiper plugs, cementing plugs, balls, diverter balls, shifting and setting balls, swabbing element protectors, buoyant recorders, pumpable collets, float shoes, and darts, screen basepipe plugs, coatings for balls and seats, liner port plugs, atmospheric discs, atmospheric chamber discs, debris barriers, drill in stim liner plugs, inflow control device plugs, seats, ball seats, direct connect disks, drill-in linear disks, gas lift valve plug, fluid loss control flappers, shear out plugs, flapper valves, gaslift valves, sleeves, screen protectors, seal bore protectors, electric submersible pump space out subs, slips, dogs, collet restraints, liner setting sleeves, timing actuation devices, whipstock lugs, emergency release tools, mandrels, release mechanisms, components of perforating gun systems, and disintegrable whipstock for casing exit tools.

7. The dissolvable sieve of claim 1, wherein body is made of a high strength controlled electrolytic metallic material.

8. The dissolvable sieve of claim 1, wherein the body is frangible.

9. A particulate tolerant system, comprising:
   a tubular;
   at least one body positioned within the tubular having openings configured to allow fluid flow therethrough while preventing flow of particulates therethrough, the at least one body being dissolvable in a target environment; and
   a tool positioned within the tubular protected from particulates by the at least one body.

10. The particulate tolerant system of claim 9, wherein pressure can be communicated through the openings in the at least one body.

11. The particulate tolerant system of claim 9, wherein at least one body is movable from a first position to a second position, such that fluid flowing through the tubular is able to pass the at least one body without flowing through the opening when the at least one body is in the first position but must flow through the openings to pass the at least one body when the at least one body is in the second position.

12. The particulate tolerant system of claim 9, wherein the openings are sized to occlude particulate from flowing therethrough that could be detrimental to the tool.

13. The particulate tolerant system of claim 9, wherein the at least one body is removable upon dissolution thereof to allow intervention through the tubular.

14. The particulate tolerant system of claim 9, wherein the at least one body is made of a high strength controlled electrolytic metallic material.

15. The particulate tolerant system of claim 9, wherein the at least one body is sealed from the target environment prior to being employed to serve a function for which it was designed.

16. A method of protecting a tool from particulate, comprising:
    filtering fluid through openings in a body positioned within a tubular prior to reaching the tool;
    entrapping particulate at the body to protect the tool; and
    dissolving the body.

17. The method of protecting a tool from particulate of claim 16, further comprising building pressure within the tubular on both sides of the body.

18. The method of protecting a tool from particulate of claim 16, further comprising actuating the tool with the building of the pressure.

* * * * *